US012709702B2

(12) United States Patent
Frinault et al.

(10) Patent No.: US 12,709,702 B2
(45) Date of Patent: Aug. 18, 2026

(54) FLEXIBLE FOOD PACKAGING LAMINATES

(71) Applicant: SUN CHEMICAL CORPORATION, Parsippany, NJ (US)

(72) Inventors: Thierry Frinault, Congleton (GB); Paul M. Kurtz, Bloomfield, NJ (US); Philippe Schottland, Sparta, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 1408 days.

(21) Appl. No.: 17/260,024

(22) PCT Filed: Jul. 25, 2019

(86) PCT No.: PCT/US2019/043345

§ 371 (c)(1),
(2) Date: Jan. 13, 2021

(87) PCT Pub. No.: WO2020/023696

PCT Pub. Date: Jan. 30, 2020

(65) Prior Publication Data

US 2022/0010182 A1 Jan. 13, 2022

Related U.S. Application Data

(60) Provisional application No. 62/801,147, filed on Feb. 5, 2019, provisional application No. 62/703,568, filed on Jul. 26, 2018.

(51) Int. Cl.

| | |
|---|---|
| ***C09J 175/12*** | (2006.01) |
| ***B32B 7/12*** | (2006.01) |
| ***B32B 27/08*** | (2006.01) |
| ***B65D 65/40*** | (2006.01) |
| ***C08G 18/10*** | (2006.01) |
| ***C08G 18/76*** | (2006.01) |
| ***C09J 5/00*** | (2006.01) |

(52) U.S. Cl.

CPC ............... *C09J 175/12* (2013.01); *B32B 7/12* (2013.01); *B32B 27/08* (2013.01); *B65D 65/40* (2013.01); *C08G 18/10* (2013.01); *C08G 18/7621* (2013.01); *C09J 5/00* (2013.01); *B32B 2307/546* (2013.01); *B32B 2553/00* (2013.01); *C09J 2475/00* (2013.01)

(58) Field of Classification Search

CPC ........ C08G 18/10; C08G 18/42; C08G 18/48; C08G 18/4211; C08G 18/4241; C08G 18/4829; C08G 18/7621; B65D 65/40; C09J 5/00; C09J 175/12; C09J 2475/00; B32B 7/12; B32B 2553/00; B32B 2439/70

USPC ...................................................... 428/423.1

See application file for complete search history.

(56) References Cited

U.S. PATENT DOCUMENTS

| | | | | |
|---|---|---|---|---|
| 2004/0138402 A1* | 7/2004 | Thiele | .................... C09J 175/04 | 528/85 |
| 2015/0259462 A1* | 9/2015 | Lalgudi | .............. C08G 18/0823 | 524/591 |
| 2018/0044462 A1 | 2/2018 | Blodau | | |

FOREIGN PATENT DOCUMENTS

| | | | | |
|---|---|---|---|---|
| CN | 1898289 A * | 1/2007 | ......... C08G 18/4072 |
| EP | 0 611 146 | 8/1994 | |
| EP | 1 377 448 | 1/2004 | |
| JP | 2006096785 A * | 4/2006 | |
| WO | WO 2017/196529 A1 | 11/2017 | |
| WO | WO 2017/196530 A1 | 11/2017 | |
| WO | WO 2018/058479 A1 | 4/2018 | |

OTHER PUBLICATIONS

International Search Report issued in International Application No. PCT/US2019/043345, mailed Oct. 24, 2019.

Written Opinion of the International Searching Authority issued in International Application No. PCT/US2019/043345, mailed Oct. 24, 2019.

International Preliminary Report on Patentability (Chapter 1 of the Patent Cooperation Treaty) issued in International Application No. PCT/US2019/043345, mailed Nov. 20, 2020.

* cited by examiner

*Primary Examiner* — Tri V Nguyen

(74) *Attorney, Agent, or Firm* — Marian E. Fundytus; Amster Rothstein & Ebenstein LLP

(57) ABSTRACT

Described herein are adhesive compositions, and in particular to solventless adhesive compositions, which can be used to construct laminates, such as flexible laminate materials used to construct flexible packaging (among other things). In another aspect, the solventless adhesive materials are essentially monomer and/or catalyst free, making them well suited for use in making laminates for packaged foods, beverages, and other sensitive materials, e.g., materials which should not be contaminated or not contaminated to unacceptable levels. Also described are laminates made with the adhesive compositions. Laminates made with the adhesive compositions exhibit sufficient bond strength to be slit after 4-8 hours after formation and even 4-5 hours after formation.

18 Claims, No Drawings

FLEXIBLE FOOD PACKAGING LAMINATES

CROSS REFERENCE TO RELATED APPLICATIONS

The present application is a § 371 National Phase application based on PCT/US2019/043345, filed Jul. 25, 2019, which claims the benefit of U.S. Provisional Application Nos. 62/703,568, filed Jul. 26, 2018 and 62/801,147, filed Feb. 5, 2019 the subject matter of each of which is incorporated by reference in their entirety.

FIELD OF THE INVENTION

The present disclosure is directed to adhesive compositions, and in particular to solventless adhesive compositions, which can be used to construct laminates, such as flexible laminate materials used to construct flexible packaging (among other things). In another aspect, the solventless adhesive materials are essentially monomer- and/or catalyst-free, making them well suited for use in making laminates for packaging foods, beverages, and other sensitive materials, e.g., materials which should not be contaminated or not contaminated to unacceptable levels. Also described are laminates made with the adhesive compositions.

BACKGROUND OF THE INVENTION

Laminate material, and in particular flexible laminate material, is used for constructing flexible containers and other flexible packaging materials. Flexible laminate material offers a number of advantages over "harder" packaging materials, among them being thinner wall thicknesses, less package volume, and lighter weight. Further, flexible laminate materials are recyclable. Food and other materials are now packaged in flexible laminate packaging.

Laminates are formed by joining at least two polymeric film or substrate materials together with an adhesive. Such adhesives are generally polyurethane-based.

There are three main kinds of laminating adhesives: solvent-based, water-based, and solvent-free (a/k/a solventless).

One of the advantages of solvent-free adhesives over solvent-based and water-based adhesives is that the latter two types of adhesives must be dried in ovens, whereas solvent-free adhesives do not. Thus, the laminator does not need an oven when working solvent-free adhesives.

Solvent-free laminating adhesives may contain relatively high levels of unreacted free isocyanate monomer several days after the laminate components are combined. Monomer and catalyst are known to be migratable materials, that is, materials that can migrate out of the adhesive through the sealant web and into the package interior where items such as food are held. In this situation, migratable isocyanate monomers may react with water supplied by or with the food (or other material contained therein) and be transformed, in the case of aromatic isocyanates, into primary aromatic amines (PAA). Thus, state of the art solvent-free laminating adhesives may not be acceptable for constructing food packaging laminates.

There are commercially available prepolymer polyurethane materials that contain very small amounts of isocyanate monomer. For example, there are prepolymer polyurethane materials that include diphenylmethane diisocyanate in an amount less than 0.1 wt %. However, these materials may exhibit elevated viscosities that prevent their use on current solvent-free laminators at reasonable application temperatures.

Other commercially available polyurethane prepolymer materials include toluene diisocyanate (TDI). Some of these materials include less than 0.1 wt % TDI (unreacted excess TDI remaining after polymerization is flashed off). Examples of such materials are Baxenden Trixene SC7721, Trixene SC7722 and Trixene SC7725; Sapici Polurflex 7910, Polurgreen PRP450 01, and Polurgreen PRP 750 01.

However, these prepolymers, when reacted with standard polyols (e.g., castor oil, polyester polyol, polypropylene glycol, lactide polyol and combinations thereof), display low activity, slow cure, and slow bond strength development. Laminates constructed with adhesives made with such prepolymers therefore take a relatively long time to develop strong bonds with the laminate layers. Laminates for packaging and the like are slit, e.g., cut, into smaller sizes. Laminates made with such adhesives including standard polyols and urethane prepolymers typically need to cure for at least 24 hours before they can be slit.

While catalysts may be included in adhesives for laminate flexible packaging, such as to speed up the reaction between the adhesive components to cause faster cure, catalysts are also low molecular weight migratable materials. Thus, from this perspective, it is not desirable to include catalysts in laminating adhesives used to construct food packaging. In some jurisdictions these catalysts do not meet food contact regulations.

Polymeric flexible films are commercially available in reel form in which the films are wound onto reels. The produced laminates are also wound and packaged on reels and are slit on a reel to reel slitting machine to the width required for making the package.

In making packaging, the flexible laminate is unspooled from the reel and slit on the slitting machine to the required width. The smaller slit material is then wound onto a reel.

Reel slitting is a shearing operation that cuts a large roll of material into narrower rolls. The laminated roll is placed on a slitter and as the lamination web is run through the slitter and the web is cut into the desired web widths. For example, a 100 cm roll may split into three 33 cm rolls. In rewind slitting, the web is unwound and run through the machine, passing through blades or lasers, before being rewound on one or more shafts to form narrower rolls.

References that may be of interest include EP 1 377 448 and EP 0 611 146.

SUMMARY OF THE INVENTION

Described herein are adhesive compositions which are acceptable for use in making laminates used to construct food packaging. The laminates can contain no isocyanate monomer or can contain isocyanate monomers in very small and tolerable amounts. Further, they are free of or are essentially free of solvent. The laminates can be made without including catalysts, though catalysts may be used in situations in which their use is acceptable. The laminates cure rapidly, even when catalyst is not included, resulting in only a short amount of time between mixing and/or laminating and slitting time (e.g., about 4 to about 5 hours).

The adhesive compositions include:

a) amine-free polyol;

b) polyol including one or more tertiary amine groups; and c) polyurethane prepolymer.

In one aspect, the adhesive composition is free or is essentially free of solvent.

In one aspect, the amine-free polyol is present in an amount of 10 wt % to 40 wt %, preferably 15 wt % to 35 wt %. This is the total amount of amine-free polyol that is present (e.g., the total whether one amine-free polyol is present or more than one amine-free polyol is present). It is also based on the total weight of the adhesive composition.

In one aspect, the polyol including one or more tertiary amine groups, e.g., tertiary amine groups on the polyol backbone, is present in an amount of 0.5 wt % to 10 wt %; preferably 0.5 wt % to 5.0 wt %. This is the total amount of polyol including one or more tertiary amine groups that is present (e.g., the total whether one polyol including one or more tertiary amine groups or more than one polyol including one or more tertiary amine groups is present). It is also based on the total weight of the adhesive composition.

In one aspect, the polyurethane prepolymer is present in an amount of 40 wt % to 90 wt %, preferably 50 wt % to 90 wt %. This is the total amount of polyurethane prepolymer that is present (e.g., the total whether one polyurethane prepolymer or more than one polyurethane prepolymer is present). It is also based on the total weight of the adhesive composition.

In one aspect, the polyurethane prepolymer is free or essentially free of isocyanate monomers and solvent-free.

"Free or essentially free of solvent" means the adhesive composition contains solvent in an amount≤5.0 wt %, e.g., 0% wt to 5.0 wt % and/or 0.0001 wt to 5.0 wt %, based on the total amount of the composition, and without drying the composition with heat. It is preferred however that solvent, if present, be present in amounts less than 5.0 wt %, e.g., 0.0001 wt to 1.0 wt %, more preferably 0.0001 wt % to 0.5 wt %, still more preferably 0.0001 wt to 0.1 wt %. A solvent is an unreactive diluent; that is, it does not react with the components of the adhesive composition. For example it does not include functional groups such as hydroxyl functional groups or acid functional groups, which can react with a polyurethane isocyanate-terminated prepolymer.

In one aspect, the adhesive composition is free or essentially free of monomers, and in particular, isocyanate monomers.

As used herein, "isocyanate monomer" or "isocyanate monomers" includes isocyanate monomers and diisocyanate monomers.

In one aspect, "free or essentially free of isocyanate monomers", means an amount of isocyanate monomer extractable from the adhesive composition that is ≤0.5 wt %, e.g., 0 wt % to 0.5 wt % and/or 0.0001 wt % to 0.5 wt %. This amount is based on the total weight of the composition.

In one aspect, "free or essentially free of isocyanate monomers" means an amount of isocyanate monomer extractable from the adhesive composition that is ≤0.1 wt %, e.g., 0 wt % to 0.1 wt % and/or 0.0001 wt % to 0.1 wt %. This amount is based on the total weight of the composition.

In one aspect, the adhesive composition is free or essentially free of isocyanate monomers in the amounts defined herein, e.g., ≤0.5 wt %, e.g., 0 wt % to 0.5 wt % and/or 0.0001 wt % to 0.5 wt %, preferably ≤0.1 wt %, e.g., 0 wt % to 0.1 wt % and/or 0.0001 wt % to 0.1 wt %, based on the total weight of the composition.

In one aspect, the adhesive composition is free or essentially free of toluene diisocyanate monomer in the amounts defined herein, e.g., ≤0.5 wt %, e.g., 0 wt % to 0.5 wt % and/or 0.0001 wt % to 0.5 wt %, preferably ≤0.1 wt %, e.g., 0 wt % to 0.1 wt % and/or 0.0001 wt % to 0.1 wt %, based on the total weight of the composition.

In one aspect, the adhesive composition is free of catalyst.

In one aspect, the compositions include catalyst.

In one aspect, the compositions include catalyst, present in an amount of 0.05 wt % to 0.5 wt %, preferably 0.1 wt % to 0.5 wt % and more preferably 0.2 wt % to 0.5 wt %. This amount is based on the total weight of the composition.

In a further aspect, described herein are laminates comprising first and second substrate layers, adhered together with the adhesive composition as described herein.

In one aspect, the substrate layers of the laminates are flexible materials, such as flexible polymer materials and metal foils.

In another aspect, described herein are rolls of laminates. The rolls may long continuous laminate sheets in an uncut or unslit state. The rolls of laminates may also be rolls formed of slit laminate sheets, which are produced by slitting the long continuous laminate sheets.

In a further aspect, described herein is flexible packaging comprised of the laminate described herein.

In a further aspect, the flexible packaging is free or essentially free of migratable isocyanate monomers. That is, monomer content is ≤0.5 wt %, e.g., 0 wt % to 0.5 wt % and/or 0.0001 wt % to 0.5 wt %. This amount is based on the total weight of the composition.

In a further aspect, the flexible packaging is free or essentially free of migratable isocyanate monomers. That is, monomer content is ≤0.1 wt %, e.g., 0 wt % to 0.1 wt % and/or 0.0001 wt % to 0.1 wt %. This amount is based on the total weight of the composition.

In a further aspect, the flexible packaging is free or essentially free of migratable isocyanate monomers, in the amounts set forth herein.

In a further aspect, described herein is a packaged food or beverage item comprising a food or beverage item packaged in the flexible packaging.

In a further aspect, described herein is a method of forming a slit laminate material in relatively short time after laminate formation. The method includes the steps of:

forming a laminate comprising first and second substrate layers adhered together with the adhesive compositions described herein, thereby providing a laminate;

Curing the laminate; and

Slitting the laminate into slit laminate portions 4 to 8 hours after forming the laminate.

In one aspect, slitting the laminate into slit laminate portions occurs 4 to 5 hours after forming the laminate.

In one aspect, the formed laminate provided by the method comprises a long continuous formed laminate sheet.

In one aspect, the method further comprises the step of rolling the long continuous formed laminate onto a roll.

In one aspect, the method further comprises the step of rolling the slit laminate portions onto a roll.

In one aspect, the method further comprises the step of rolling the long continuous formed laminate onto a roll, and the step of rolling the slit laminate portions onto a roll.

In one aspect, described is a laminate comprising laminate films joined by an adhesive composition, wherein the laminate possesses film tear of ≥2N/15 mm, 24 hours after laminate formation.

The laminates adhesives described herein undergo faster reactivity time, e.g., faster curing time, that shortens the time to laminate slitting. For example, whereas 24 hours is required between formation and slitting for conventional laminate adhesives, only 4 to 8 hours and even only 4 to 5 hours is required for the present adhesives (with the shorter time being preferred). In other words, the present laminate adhesives develop sufficient bond strength to allow for slitting 4 to 8 hours and even usually 4 to 5 hours after laminate formation. Being able to slit laminates within, e.g., 4-5 hours after the laminates are formed, rather than having to wait for up to 24 hours, is a significant benefit to the end user of the laminate adhesives. Shortened slitting times are beneficial to laminate manufacturers since it allows them to cycle through laminate production and slitting operations much more quickly than when using laminates made with conventional adhesives.

The development of sufficient bond strength for slitting and/or shortened curing times (4-8 hours, even 4-5 hours) has been obtained when curing of the present adhesive laminates takes place at 30° C. and 50% relative humidity (RH).

In the adhesives and laminates of the present invention, migratable catalysts and isocyanate monomers are eliminated, thus laminates employing the present adhesives are safe for use in food packaging.

DETAILED DESCRIPTION OF THE INVENTION

The present application presents laminate adhesives and laminate structures that overcome the problems mentioned herein. For example, flexible laminates constructed of two polymeric films bonded together with the adhesives described herein can be used in making food packaging. The laminate adhesives are free or essentially free of migratable monomers and can be free or essentially free of solvent. Further, laminates formed with these adhesives possesses sufficient bond strength for slitting about 4 to 5 hours after formation.

Described herein are adhesive compositions that include:

a) amine-free polyol;

b) polyol including one or more tertiary amine groups; and c) polyurethane prepolymer.

In one aspect, the adhesive composition is free or is essentially free of solvent.

In one aspect, the amine-free polyol is present in an amount of 10 wt % to 40 wt %, preferably 15 wt % to 35 wt %. This is the total amount of amine-free polyol that is present (e.g., the total whether one amine-free polyol is present or more than one amine-free polyol is present). The amount is also based on the total weight of the adhesive composition.

In one aspect, the polyol including one or more tertiary amine groups, e.g., tertiary amine groups on the polyol backbone, is present in an amount of 0.5 wt % to 10 wt %; preferably 0.5 wt % to 5.0 wt %. This is the total amount of polyol including one or more tertiary amine groups that is present (e.g., the total whether one polyol including one or more tertiary amine groups or more than one polyol including one or more tertiary amine groups is present). The amount is also based on the total weight of the adhesive composition.

In one aspect, the polyurethane prepolymer is present in an amount of 40 wt % to 90 wt %, preferably 50 wt % to 90 wt %. This is the total amount of polyurethane prepolymer that is present (e.g., the total whether one polyurethane prepolymer or more than one polyurethane prepolymer is present). The amount is also based on the total weight of the adhesive composition.

In one aspect, the polyurethane prepolymer is isocyanate monomer-free and solvent-free.

The present application is also drawn to a method for making laminates using the combination of materials shown above, as well the laminates made from such a method.

The present disclosure provides for preparing fast curing laminates with no migratable components by combining polyols commonly used in lamination adhesives for flexible packaging (i.e. polyols not having amine in their backbone) with polyols including one or more tertiary amine groups, e.g., tertiary amine groups on the polyol backbone, and reacting such combinations with polyurethane pre-polymers that preferably are monomer-free and solvent-free. A catalyst does not have to be employed, though it is possible to use one, such as when the resulting flexible packaging is not being used for food and migratable component contamination is not an important issue.

Commercially available polyols including one or more tertiary amine groups, e.g., tertiary amine groups on the polyol backbone, which are suitable for use in the present laminate adhesives include, for example Desmophen 4051B (amine-based tetrafunctional polyether polyol) and Desmophen 4050E (amine-based tetrafunctional polyether polyol), available from Covestro; Voranol RA 640, Voranol 800, and Voranol RA500, available from Dow Chemical; EDP 300 and EDP 450, available from Adeka; Poly-Q® 40-480, Poly-Q® 43-455, Poly-Q® 40-770 from Monument Chemical (these Poly-Q® products are described as polyether polyol that is an ethylene diamine-initiated, four-functional polyether polyol), Carpol® (SPA-357 (sucrose diethanolamine and propylene oxide based polyether polyol (5.5 functional)) and Carpol® SPA-530 (sucrose/amine-initiated polyether polyol), Carpol® TEAP-265 (triethanolamine-initiated polyether polyol), Carpol® EDAP-770 (ethylene diamine-initiated polyether polyol), and Carpol® EDAP-800770 (ethylene diamine-initiated polyether polyol), available from Carpenter Chemical; and Huntsman (Jeffol® A-630 (amine-based polyether polyol), Jeffol® A-800 (amine containing polyether polyol), Jeffol® AD-310 (aromatic amine/diethylene glycol (DEG)-initiated polyol (MW 580)), Jeffol® AD-500 (aromatic amine/diethylene glycol (DEG)-initiated polyol (MW 360)), Jeffol® R-350, Jeffol® R350X (aromatic amino polyol), Jeffol® R425X (aromatic amine polyol), Jeffol® R470X (amine polyol (nonyl-phenol initiated)), available from Huntsman Chemical.

It is believed that the polyol including one or more tertiary amine groups, e.g., tertiary amine groups on the polyol backbone, accelerate the reaction of the alcohol groups of the standard polyol, while also reacting and integrating into the polymer network, since they have a plurality of reactive alcohol groups that will react with the isocyanate groups of the prepolymer. Thus, they cannot migrate out of the composition. As accelerants of the reaction (e.g., as amine-initiating polyols), they are comparable to the role of catalysts, but again they are made part of the polymer network. Based on the same principle, other amino polyols could be considered, for example triethanolamine.

Suitable (a) materials, the amine-free polyol, include castor oil (for example, Albodry Castor Oil PU Quality from Alberdingk Boley). Other suitable standard polyols include Sunlam HA520B, a polyester polyol based on adipic acid (1,4-butane dicarboxylic acid), diethylene glycol and glycerin, and Sunlam HA105B, a 70/30 mixture of a polypropylene glycol and a polyester polyol based on diethylene glycol and phthalic anhydride.

The polyurethane pre-polymer material (material (c)), may be Polurflex 7910, available from SACIPI. Polurflex 7910 is described as being solvent-less and monomer-free. Other suitable urethane pre-polymers include Trixene SC 7721 (isocyanate-terminated prepolymer), Trixene SC 7722 (toluene diisocyanate-based prepolymer (TDI-based)) and Trixene SC 7725 9 (TDI-based prepolymer), available from Baxenden Chemicals, Ltd.; Polurgreen PRP450 01 (ultra-low monomer-free linear urethane prepolymer) and Polurgreen PRP 750 01 (ultra-low monomer-free linear urethane prepolymer, available from SACIPI.

Monomer-free prepolymers are advantageous because diisocyanate monomer species are particularly prone to migrating and causing contamination. 2,4-toluene diisocyanate (2,4-TDI), 2,6-TDI, 2,2'-methylene diphenyl diisocyanate (2,2'-MDI), 2,4'-MDI, and 4,4'-MDI are known as monomers that are prone to migrating. The adhesive compositions described herein do not include these monomers, or include them in the very small amounts described herein.

Since there are virtually no monomers present in the above components and thus in the laminating adhesive systems (e.g., they are free or essentially free thereof), there is no monomer to migrate from the adhesive, which makes the adhesive compositions well suited for making laminates used in food packaging.

Applicants have found that the amount of polyol including one or more tertiary amine group plays an interesting role in the success of the described compositions. If the amount is small, e.g., less than 0.5 wt %, then sufficient bond strength will not develop in order to slit the laminate within a relatively short time (e.g., 4 to 8) hours. If the amount is large, e.g., greater than 10 wt %, then the pot life of the adhesive composition is too short for forming laminates. Applicants have found that the amounts stated herein, e.g., 0.5 wt % to 10 wt %, preferably 0.5 wt % to 5.0 wt %, provides the combination of desired properties and a sufficiently long pot life.

Suitable substrate films used to make the laminates include OPP and PE. OPP may be employed as the primary web, and PE may be used as the sealant web. Other films that can be used include OPA, PET, CPP, PETg, Met-PET, Met-OPP, Met-CPP, Alox or SiOx coated film, PE, EVOH PE, and aluminum foil, among others.

The amine-free polyol, the polyol including one or more tertiary amine groups, and the urethane prepolymer can be mixed at temperatures of about 45° C. to 55° C. to form the adhesive compositions described herein.

In some instances, a catalyst may be included in the present compositions, such as when the laminate compositions will be used in situations where including migratable components is a lesser issue or is not an issue at all. Suitable catalysts include tin catalysts, bismuth catalysts, zinc catalysts, zirconium catalysts, aluminum catalysts and tertiary amines. The catalysts may be present in the composition in amounts of 0.05 wt % to 0.5 wt %, preferably 0.1 wt % to 0.5 wt % and more preferably 0.2 wt % to 0.5 wt %.

Examples of suitable catalysts include tertiary amines such as 1,4-diazabicyclo [2.2.2] octane (DABCO), metallic compounds such as dibutyl tin dilaurate, stannous octoate and bismuth neodecanoate, triphenyl bismuth (King Industries K-KAT XC-B221, K-KAT 348, K-KAT XK-651, K-KAT XK-614), zirconium tetrakis (2,4-pentanedionato) (King Industries K-KAT 4205, K-KAT 6212). Suitable catalysts are the known polyurethane catalysts such as, for example, compounds of divalent and tetravalent tin, more particularly the dicarboxylates of divalent tin and the dialkyl tin dicarboxylates and dialkoxylates. Examples of such catalysts are dibutyl tin dilaurate, dibutyl tin diacetate, dioctyl tin diacetate, dibutyl tin maleate, tin(II) octoate, tin(II) phenolate or even the acetyl acetonates of divalent and tetravalent tin. Tertiary amines or amidines may also be used as catalysts, optionally in combination with the tin compounds mentioned above. Suitable amines are both acyclic and, in particular, cyclic compounds. Examples include tetramethyl butane diamine, bis-(dimethylaminoethyl)-ether, 1,4-diazabicyclooctane (DABCO), 1,8-diazabicyclo-(5.4.0)-undecane, 2,2'-dimorpholinodiethyl ether or dimethyl piperazine or even mixtures of the amines mentioned above.

Applicants have found that initial viscosity should be about 900 mPa·s to 1600 mPa·s (millipascal-second) at the application temperature, more preferably 1000-1500. After 30 minutes, the viscosity should be 2000 mPa·s to 8000 mPa·s after 30 minutes, more preferably from about 2000 mPa·s to 5000 mPa·s.

EXAMPLES

The following examples are intended to exemplify particular embodiments of the compositions described herein and are not intended to limit the scope thereof in any respect and should not be so construed.

Exemplary adhesive compositions as described herein and comparison exemplary adhesive compositions were prepared and are described below. The adhesive components were mixed at 50° C. Adhesive compositions were maintained at this temperature for 30 minutes. Tables 1, 2 and 3 report the viscosities of the adhesive compositions at 1, 10, 20 and 30 minutes, in order to evaluate reaction times and pot life. Component parts by weight (PBW) are given in the left column of Tables 1-3.

The amount of component (b), polyol including one or more tertiary amine groups, e.g., tertiary amine groups on the polyol backbone, was varied (the comparative examples do not contain component (b)).

TABLE 1

Adhesive Compositions including Castor Oil as Component (a)

| | Time (minutes) | | | |
|---|---|---|---|---|
| PBW: Polurflex 7910 (c)/castor oil (a)/Desmophen 4051B (b) | 0 | 10 | 20 | 30 |
| | Viscosity mPa · s at 50° C. | | | |
| Example 1 (comparative) 100/25/0 | 980 | 1050 | 1230 | 1460 |
| Example 2 (inventive) 100/24/1 | 1075 | 1340 | 1610 | 1930 |
| Example 3 (inventive) 100/23/2 | 1200 | 1650 | 2060 | 2520 |
| Example 4 (inventive) 100/22/3 | 1375 | 2170 | 2720 | 3340 |
| Example 5 (inventive) 100/21/4 | 1400 | 2375 | 3295 | 4220 |
| Example 6 (comparative) 100/50/0 | 615 | 675 | 800 | 935 |
| Example 7 (inventive) 100/46/4 | 900 | 1395 | 1905 | 2540 |

Table 1 shows that the adhesive compositions of Comparative Examples 1 and 6, which do not contain polyol including one or more tertiary amine groups, undergo very slow reactions, as evidenced by viscosity increasing to only 935 mPa·s (CE6) and 1460 mPa·s (CE1). The inventive adhesive compositions, which contain polyol including one or more tertiary amine groups (Examples 2, 3, 4, 5, 7), exhibit much faster reaction times (viscosity increases to 1930 mPa·s to 4220 mPa·s).

For further testing, Examples 1, 4, 6 and 7 were chosen for the preparation of the laminates (results for these combinations are presented in Table 4).

TABLE 2

| Adhesive Compositions including Sunlam HA520B as Component (a) | | | | |
|---|---|---|---|---|
| | Time (minutes) | | | |
| PBW: Polurflex 7910 (c)/HA520B (a)/Desmophen 4051B (b) | 0 | 10 | 20 | 30 |
| | Viscosity mPa · s at 50° C. | | | |
| Example 8 (comparative) 100/50/0 | 1150 | 1125 | 1170 | 1270 |
| Example 9 (inventive) 100/49/1 | 1330 | 1520 | 1700 | 2045 |
| Example 10 (inventive) 100/48/2 | 1375 | 1876 | 2320 | 2800 |
| Example 11 (inventive) 100/46/4 | 1700 | 2630 | 3860 | 5235 |

SunlamHA520B is a polyester polyol based on adipic acid (1,4-butane dicarboxylic acid), diethylene glycol and glycerin.

Table 2 shows that the adhesive composition of Comparative Example 8, which does not contain polyol including one or more tertiary amine groups, undergoes a very slow reaction, as evidenced by a viscosity increase from 1150 mPa·s to only 1270 mPa·s in 30 minutes. The inventive adhesive compositions that contain polyol including one or more tertiary amine groups (Examples 9, 10, 11), exhibit much faster reaction times (viscosity increases to 2045 mPa·s, 2800 mPa·s, and 5235 mPa·s respectively).

For further testing, Examples 8 and 10 were chosen for the preparation of the laminates (results for these combinations are presented in Table 5).

TABLE 3

| Adhesive Compositions including Sunlam HA105B as Component (a) | | | | |
|---|---|---|---|---|
| | Time (minutes) | | | |
| PBW: Polurflex 7910 (c)/HA105B (a)/Desmophen 4051B (b) | 0 | 10 | 20 | 30 |
| | Viscosity mPa · s at 50° C. | | | |
| Example 12 (comparative) 100/30/0 | 990 | 1085 | 1270 | 1475 |
| Example 13 (inventive) 100/29/1 | 965 | 1140 | 1350 | 1590 |
| Example 14 (inventive) 100/28/2 | 1110 | 1700 | 2150 | 2630 |

Sunlam HA105B is a 70/30 mixture of a polypropylene glycol and a polyester polyol based on diethylene glycol and phthalic anhydride, as described above.

Table 3 shows that the adhesive composition of Comparative Example 12, which does not contain polyol including one or more tertiary amine groups, undergoes a very slow reaction (viscosity only increases from 990 mPa·s to 1475 mPa·s over 30 minutes). The inventive adhesive compositions that contain polyol including one or more tertiary amine groups (Examples 13, 14) exhibit faster reaction times, particularly example 14 with a viscosity increases from 1110 mPa·s to 2630 mPa·s.

For further testing, Examples 12 and 14 were chosen for the preparation of the laminates (results for these combinations are presented in Table 6).

Laminate Examples

The laminates were produced on a Labo Combi 400 laminator made by Nordmeccanica Group using the following conditions:

Primary Web: RLC30, 30 μm OPP Film from Innovia.
Secondary Web: 50 μm PE from Ticinoplast.
Coating weight: 2.1 gsm/dry.
Adhesive Roller Speed: 80%.
Adhesive Roller Temp: 45° C.
Application Roller Temp: 50° C.
Tension Unwinder A (OPP): 23 N.
Tension Unwinder B (PE): 9 N.
Tension Rewinder (Laminate): 28 N.
Coating head pressure: 3 bars.
Nip pressure: 3 bars.
Nip temperature 50° C.
Laminates cured at 30° C., 50% RH.

TABLE 4

| Laminate | | T-peel bond strength (N/15 mm) at 100 mm/min after x hours of curing | | | |
|---|---|---|---|---|---|
| Example | Adhesive | 1 Hour | 3 Hours | 5 Hours | 24 Hours |
| Example 15 (comparative) | Example 1 | 0.07 | 0.14 | 0.13 | 3.9 |
| Example 16 (comparative) | Example 6 | 0.07 | 0.11 | 0.13 | 4.3 |
| Example 17 (inventive) | Example 4 | 0.1 | 0.2 | 0.5 | 3.2 |
| Example 18 (inventive) | Example 7 | 0.1 | 0.5 | 1.6 | 3.4 |

Mode of failure: all encountered adhesive split between 1-5 hours. Film-break OPP for all after 24 hours. Adhesive split: when the laminate is opened, adhesive is on both laminate sides; the split happening in the adhesive. Film break: the cohesion of the laminate in the peeling tests is stronger than the film.

Table 4 shows that within 4 to 5 hours, the bond strengths of the laminates made with the adhesives described herein increase to 0.5N/15 mm and 1.6N/15 mm (Examples 17 and 18 respectively) after 5 hours, which are bond strengths that allow for good slitting of the laminates. In contrast, the Comparative Examples 15 and 16, which are laminates made using adhesives of comparative Examples 1 and 6, only display 0.13N/15 mm of bond strength after 5 hours, which is insufficient for laminate slitting. After 24 hours all of the laminated material had reacted sufficiently for slitting.

TABLE 5

| Laminate | | T-peel bond strength (N/15 mm) at 100 mm/min after x hours of curing | | | |
|---|---|---|---|---|---|
| Example # | Adhesive | 1 Hours | 3 Hours | 5 Hours | 24 Hours |
| Example 19 (comparative) | Example 8 | 0.15 | 0.26 | 0.27 | 3.2 |
| Example 20 (Inventive) | Example 10 | 0.17 | 0.40 | 1.27 | 3.4 |

Mode of failure: all encountered adhesive-split between 1 to 5 hours. Film-break OPP for all after 24 hours.

Table 5 shows that within 5 hours, the bond strength of Example 20, a laminate made with the adhesive of Example 10 has increased to 1.27N/15 mm, which is a bond strength that allows for good slitting of the laminate. In contrast, the laminate of Comparative Example 19, made with the adhesive of Comparative Example 8, only has bond strength of 0.27N/15 mm after 5 hours, which is insufficient for slitting. After 24 hours, all of the laminates possess sufficient bond strength for slitting.

TABLE 6

| Laminate | | T-peel bond strength (N/15 mm) at 100 mm/min after x hours of curing | | | |
|---|---|---|---|---|---|
| Example # | Adhesive | 1 Hour | 3 Hours | 5 Hours | 24 Hours |
| Example 21 (comparative) | Example 12 | 0.22 | 0.36 | 0.36 | 3.4 |
| Example 22 (Inventive) | Example 14 | 0.22 | 0.41 | 0.76 | 3.4 |

Mode of failure: all encountered adhesive-split between 1 to 5 hours. Film-break OPP for all after 24 hours.

Table 6 shows that within 5 hours, the bond strength of Example 22, a laminate made with the adhesive of Example 14, has increased to 0.76N/15 mm, which is bond strength that allows for good slitting of the laminate. In contrast, the laminate of Comparative Example 21, made with the adhesive of Comparative Example 12, only has bond strength of 0.36N/15 mm after 5 hours, which is insufficient for slitting. After 24 hours, all of the laminates possess sufficient bond strength for slitting.

As there are none and/or virtually no isocyanate monomers present in the described laminating adhesives, there can be no monomer migration into food packaged in laminates made with the described adhesives.

Primary aromatic amine extractions were carried out after 24 hours with 3% acetic acid stimulant at 70° C. for 2 hours. The extracts were analyzed in a liquid chromatography with mass spectrum detector (LCMS) for purposes of detecting the following primary aromatic amine analytes: 2,4-diaminotoluene (2,4-TDA, CAS #95-80-7), 2,6-diaminotoluene (2,6-TDA, CAS #823-40-5). None of the target analytes were detected (thus containing <1 ppb), as these diisocyanate monomers are used to prepare the Polurflex 7910 polyurethane prepolymer used in the adhesive composition examples described above.

Test Methods:

Bond Strength Test—These tests were carried out to ASTM D903 test procedure, except that the test sample size used in every case was 1.5×20 cm.

Migration Test—The samples were supplied in brown amber jars with sealed tape each containing volumes of approximately 55 mL extracted from print areas of 275 $cm^2$. Direct aliquot samples were transferred into brown GC vials for LCMS analysis for the following primary aromatic amine analytes: 2,4-TDA and 2,6-TDA. An extra sample was made using 30 ml of 3% acetic acid and spiked with target analytes to enable analyte recoveries to be checked. The spiking intermediate solution was a 0.60 μg/mL aryl amine mixture.

The following conditions were used for the migration testing:

Instrument: Shimadzu LCMS 8040 QQQ with Nexera UPLC

Column Details: Kinetix 100 mm×2.3 mm×1.7u C18 with Guard column (P/N: 00-4678-w9)

Mobile Phase: [A] LCMS Water (0.1% Formic Acid)

[B] LCMS Methanol (0.1% Formic Acid)

Gradient: 1% B (4 min)-85% B (10 min)-1% B (10 min)-1% B (15 min)

Flow rate: 0.3 ml/min

Column temp ° C.: 40

Rinse solvent: Acetonitrile

Injection Volume: 10 μL

Pot Life/Reactivity—The increases of viscosities, used to determine pot life of the mixed adhesives, were measured on a TA Instruments rheometer model AR 1500 ex, at 50° C. and 30 $s^{-1}$ using a 2-degree 60 mm cone.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. An adhesive composition comprising:

a) 10 wt % to 40 wt % of amine-free polyol;

b) 0.5 wt % to 10 wt % of polyol including one or more tertiary amine groups; and c) 40 wt % to 90 wt % of polyurethane prepolymer, wherein the adhesive composition is free or essentially free of isocyanate monomers, and wherein free or essentially free of isocyanate monomer is an amount of monomer extractable from the adhesive composition that is 0 wt % to 0.1 wt %.

2. The adhesive composition of claim 1, wherein the adhesive composition is free or is essentially free of solvent.

3. The adhesive composition of claim 1, wherein the monomer is toluene diisocyanate.

4. The adhesive composition of claim 1, further comprising one or more of: a plurality of amine-free polyols; a plurality of polyols including one or more tertiary amine groups; or a plurality of polyurethane prepolymers.

5. The adhesive composition of claim 1, wherein the adhesive composition is free of catalyst.

6. The adhesive composition of claim 1, further comprising catalyst.

7. The adhesive composition of claim 6, wherein the catalyst is present in an amount of 0.05 wt % to 0.5 wt %.

8. The adhesive composition of claim 1, wherein the polyol including one or more tertiary amine groups is present in an amount of 0.5 wt % to 5.0 wt %.

9. The adhesive composition of claim 1, wherein the amine-free polyol is present in an amount of 15 wt % to 35 wt %.

10. The adhesive composition of claim 1, wherein the polyurethane prepolymer is present in an amount of 50 wt % to 90%.

11. A laminate comprising:

first and second substrate layers, adhered together with the adhesive composition of claim 1.

12. The laminate of claim 11, wherein the substrate layers are flexible polymeric materials.

13. A roll of laminate sheet, comprising the laminate of claim 11.

14. Flexible packaging comprised of the laminate of claim 11.

15. A method of forming laminate material suitable for slitting comprising the steps of:

forming a laminate comprising first and second substrate layers adhered together with the adhesive composition of claim 1; and curing the laminate for 4 to 8 hours, in which 4 to 8 hours bond strength sufficient to slit the laminate develops.

16. The method of claim 15, further comprising the step of slitting the laminate into slit laminate material 4 to 8 hours after forming the laminate.

17. The method of claim 15, wherein the laminate comprises a long continuous formed laminate sheet.

18. The method of claim 15, further comprising the step of rolling the long continuous formed laminate sheet onto a roll.

* * * * *